(12) United States Patent
Nakajima

(10) Patent No.: US 8,051,960 B2
(45) Date of Patent: Nov. 8, 2011

(54) BRAKING APPARATUS FOR BLIND

(75) Inventor: Hiroyuki Nakajima, Tokyo (JP)

(73) Assignee: Nichibei Co., Ltd., Tokyo (JP)

( * ) Notice: Subject to any disclaimer, the term of this patent is extended or adjusted under 35 U.S.C. 154(b) by 257 days.

(21) Appl. No.: 12/518,227

(22) PCT Filed: Dec. 17, 2007

(86) PCT No.: PCT/JP2007/074203
§ 371 (c)(1),
(2), (4) Date: Jun. 11, 2009

(87) PCT Pub. No.: WO2008/075634
PCT Pub. Date: Jun. 26, 2008

(65) Prior Publication Data
US 2010/0018655 A1    Jan. 28, 2010

(30) Foreign Application Priority Data
Dec. 8, 2006    (JP) .................................. 2006-339738

(51) Int. Cl.
*F16H 3/44*    (2006.01)
(52) U.S. Cl. . 188/82.7; 188/82.1; 160/299; 192/105 CD
(58) Field of Classification Search ................. 188/82.1, 188/82.7; 192/105 CD, 147, 215; 160/8, 160/291, 292, 296, 300, 302, 299
See application file for complete search history.

(56) References Cited

U.S. PATENT DOCUMENTS

| 4,513,805 | A | * | 4/1985 | Mase ............................ 160/299 |
| 5,577,587 | A | * | 11/1996 | Jansson .................. 192/105 CD |
| 6,155,328 | A |   | 12/2000 | Welfinder |
| 6,253,896 | B1 | * | 7/2001 | Notaras et al. ......... 192/105 CD |
| 6,550,597 | B2 | * | 4/2003 | Taniguchi ..................... 192/215 |

OTHER PUBLICATIONS

International Search Report (Jan. 8, 2008) corresponding to PCT/JP2007/074206.

* cited by examiner

*Primary Examiner* — Christopher Schwartz
(74) *Attorney, Agent, or Firm* — Miller, Matthias & Hull, LLP

(57) ABSTRACT

A braking apparatus for a blind, used to reduce the speed of a shielding member of the blind when it is lifted and lowered, in which weights are stably supported and operated without an increase in the size of the braking apparatus. The braking apparatus has a casing, a rotor rotatably supported with in the casing, and weights adapted to rotate together with the rotor in such a way that they can be in contact with the inner peripheral surface of the casing. A cylindrical shaft portion and weight support portions radially projecting from the peripheral surface of the shaft portion at equal intervals in the circumferential direction are formed on the rotor. One end of each weight is swingably supported by the weight support portion extending over the axial-direction entire length of the weight.

3 Claims, 3 Drawing Sheets

Fig. 1
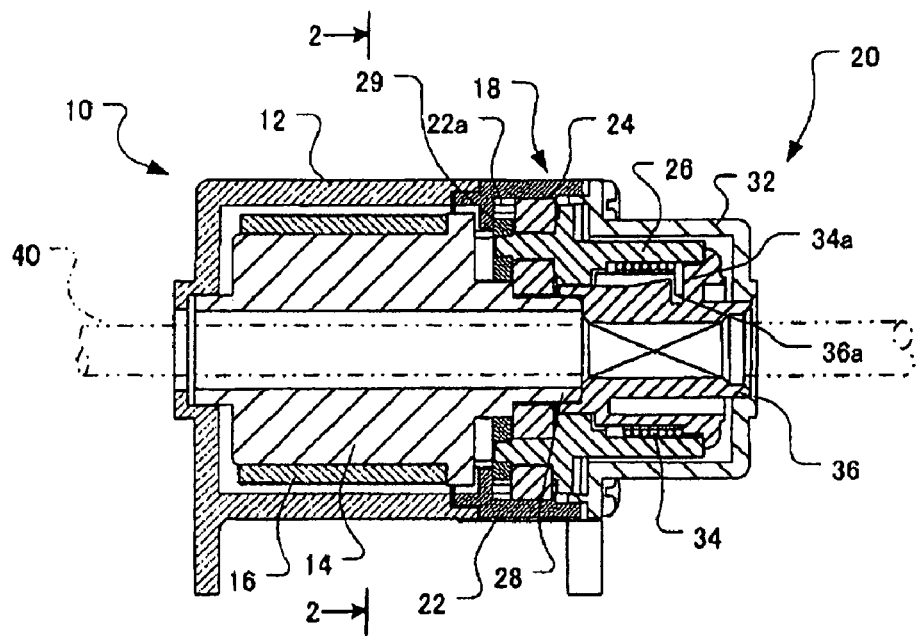
Fig. 2
Fig. 2A
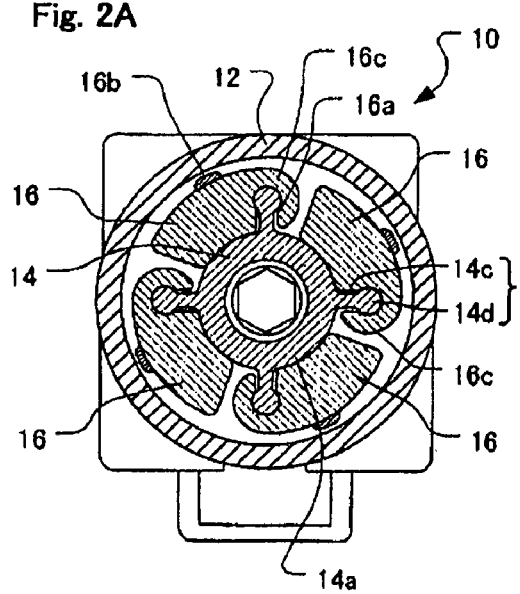
Fig. 2B
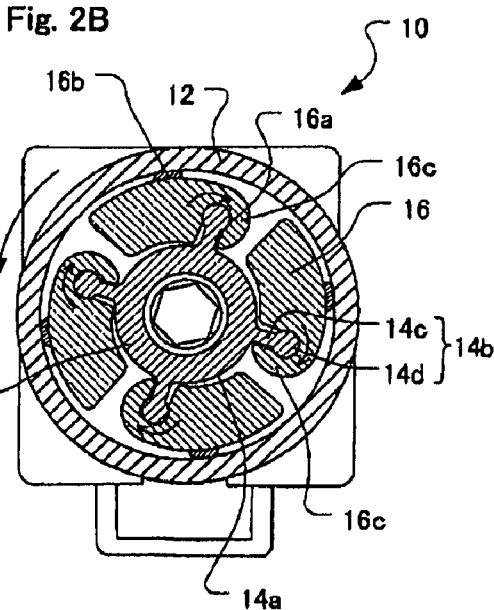

BRAKING APPARATUS FOR BLIND

CROSS-REFERENCE TO RELATED APPLICATIONS

This application is a U.S. national stage filing of International Patent Application No. PCT/JP2007/074203 filed on Dec. 17, 2007, which claims priority under the Paris Convention to Japanese Patent Application No. 2006-339738, filed on Dec. 18, 2006.

FIELD OF THE DISCLOSURE

The present invention relates to a braking apparatus for a blind, used to reduce the speed of a shielding member of the blind when it is lifted and lowered.

BACKGROUND OF THE DISCLOSURE

As a braking apparatus for blind of such a type, there is known one disclosed in Jpn. UM Appln. Publication No. 1-45353 or Jpn. Pat. Appln. Laid-Open Publication No. 11-270257.

A braking apparatus of Jpn. UM Appln. Publication No. 1-45353 has a brake shoe drum, brake shoes frictionally engaged with the brake shoe drum by centrifugal force, and a planetary gear drive rotatably supporting the brake shoes. The planetary gear drive supports the brake shoes by a support integrally formed with a central gear thereof. Because of the function of the planetary gear drive, the support formed integrally with the central gear of the planetary gear drive rotates with an increased speed. The rotation of the support exerts centrifugal force on the brake shoes, allowing the brake shoes to be engaged with the brake drum, whereby braking power is obtained.

The support is constituted by a support piece and a pair of shafts extending from the support piece. The brake shoes are pivotally supported by the shafts, respectively.

In a fluid brake disclosed in Jpn. Pat. Appln. Laid-Open Publication No. 11-270257, a partitioned chamber housing a liquid and an impeller and the impeller relatively rotates to cause the liquid to rotate, allowing the rotation of a winding element to which the impeller or partitioned chamber is connected to be delayed.

The impeller has a plurality of vanes. A rounded bead formed on the bottom of the vanes is slidingly inserted into a longitudinally-extending, rounded groove formed around an impeller hub.

SUMMARY OF THE DISCLOSURE

Technical Problem

However, in the braking apparatus of Jpn. UM Appln. Publication No. 1-45353, the shafts of the support which pivotally support the brake shoes serving as weights are in a cantilever state with respect to the support piece. Thus, when centrifugal force is applied to the weights in accordance with rotation of the support, the shafts tend to wobble, which prevents the weights from being properly opened, and the brake cannot operate as expected.

In the fluid brake disclosed in Publication No. 11-270257, the plurality of blades are supported at the rounded grooves formed around the impeller hub, so that the diameter of the hub needs to be increased, resulting in an increase in the size of the brake. Further, numbers of blades cannot be provided without increasing the diameter of the hub.

The present invention has been made in view of the above problems, and an object thereof is to provide a braking apparatus for blind in which the weights are stably supported and operated without an increase in the size of the braking apparatus.

Solution to Problem

To attain the above object, according to an aspect of the present invention, there is provided a braking apparatus for blind used to reduce the speed of a shielding member of the blind when it is lifted and lowered, characterized by including a casing, a rotor rotatably supported with in the casing, and a plurality of weights adapted to rotate together with the rotor in such a way that they can be in contact with the inner peripheral surface of the casing so as to generate braking effect. The rotor is formed with a cylindrical shaft portion and a plurality of weight support portions radially projecting from the peripheral surface of the shaft portion at equal intervals in the circumferential direction. One end portion of each weight is swingably supported by the weight support portion extending over the axial-direction entire length of the weight. The weight support portion radially projecting from the shaft portion of the rotor extends over the axial-direction entire length of the weight, so that the mechanical strength of the weight support portion can stably be ensured, thereby preventing axial wobbling of the weight support portion, which allows the weight to be stably supported. As a result, stable braking power can be obtained. Further, the weight support portion projects in the radial direction from the shaft portion, so that it is possible to increase the number of weight support portions to be formed while keeping the diameter of the shaft portion as small as possible, that is, while keeping the size of the braking apparatus compact. When the number of the weights is increased, high and stable braking power can be obtained.

Three or more of the weight support portions can be formed on the peripheral surface of the shaft portion. Because three or more weights can be provided, whereby high and stable braking effect can be obtained.

The weight support portion can include a neck portion radially extending from the shaft portion and having a rectangular traverse cross-section and a head portion formed at the distal end of the neck portion and having a circular traverse cross-section. The thickness of the neck portion having the rectangular traverse cross-section is smaller than the diameter of the head portion having the circular traverse cross-section. Each weight is formed with a groove into which the neck portion and head portion are inserted so that a gap is formed between the neck portion and the groove. The mechanical strength and rigidity of the weight support portion can be kept by the neck portion, thereby preventing axial wobbling of the weight support portion more reliably. Further, the weight is securely prevented from dropping from the weight support portion during use.

BRIEF DESCRIPTION OF THE DRAWINGS

FIG. 1 is a longitudinal cross-sectional view showing a braking apparatus for blind according to the present invention;

FIG. 2 is a traverse cross-sectional view taken along the 2-2 line of FIG. 1, in which (a) shows a state where the weights are closed and (b) shows a state where the weights are opened;

REFERENCE SIGNS LIST

Figure 3:
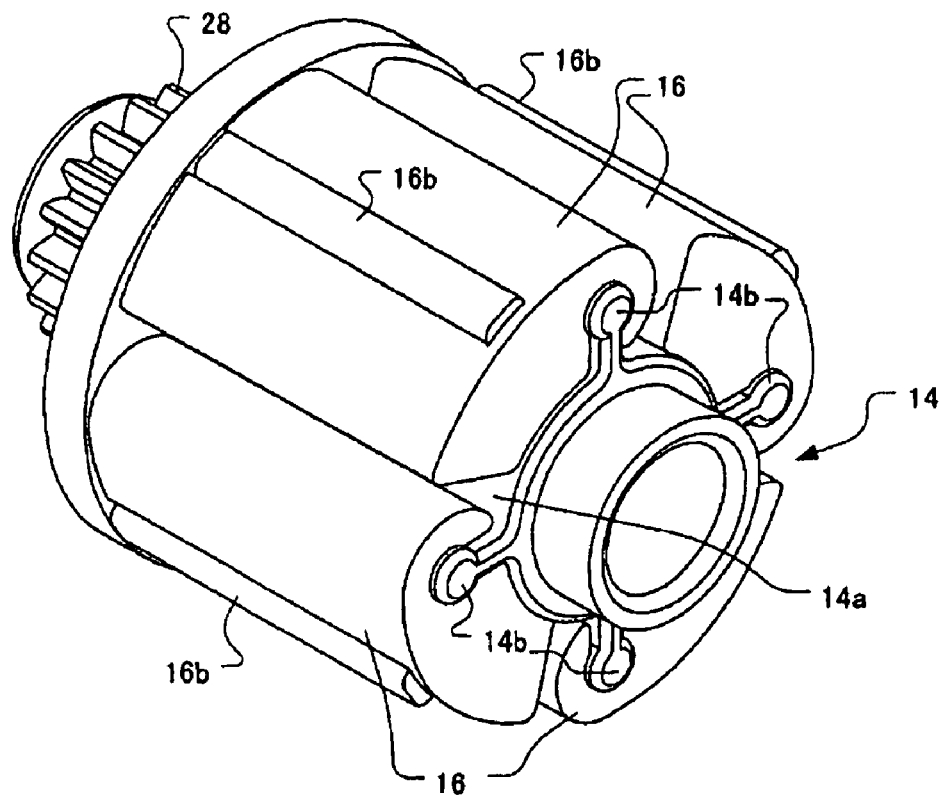
FIG. 3 is a perspective view of a rotor and weights.

10: Braking apparatus for blind
12: Casing
14: Rotor
14a: Shaft portion
14b: Weight support portion
14c: Neck portion
14d: Head portion
16: Weight
16a: Groove
16c: Base end portion (one end portion)

DESCRIPTION OF EMBODIMENTS

An embodiment of the present invention will be described below with reference to the accompanying drawings.

FIG. 1 is a cross-sectional view showing a braking apparatus for blind according to the present invention. This braking apparatus for blind can be applied to a blind of any type having a shielding member, such as a venetian blind, a roll screen, a pleated screen, or a roman shade, and operates so as to reduce the speed of the shielding member of the blind when it is lifted and lowered by its own weight or energizing force of a spring in order to prevent the lifting/lowering speed from excessively increasing.

A braking apparatus 10 includes a casing 12, a rotor 14 rotatably supported with in the casing 12, a plurality of weights 16 rotating together with the rotor 14 in such a way that they can be in contact with an inner peripheral surface of the casing 12, a planetary gear mechanism 18, and a one-way clutch mechanism 20.

The planetary gear mechanism 18 includes a second casing 22 on an inner peripheral surface of which an inner gear 22a is formed, a planetary gear 24, a planetary shaft 26 supporting the planetary gear 24, a sun gear 28 integrally formed with the rotor 14 at an extending portion of the rotor 14, and a planetary cap 29.

The one-way clutch mechanism 20 includes a clutch case 32, a clutch spring 34, and an input shaft 36. One end 34a of the clutch spring 34 is inserted into a hole portion 36a of the input shaft 36 and the remaining part of the clutch spring 34 is wound around the inner peripheral surface of the planetary shaft 26.

Rotary motion associated with the blind lifting/lowering speed from the blind is transmitted through a blind drive shaft 40 denoted by a virtual line of FIG. 1 to the input shaft 36 of the one-way clutch mechanism 20. In the case where the input shaft 36 rotates in the direction for which speed reduction should be made, the clutch spring 34 of the one-way clutch mechanism 20 is pressed against the inner peripheral surface of the planetary shaft 26 so as to connect the input shaft 26 and planetary shaft 26, causing them to rotate in an integrated manner. As a result, the rotation speed of the planetary shaft 26 is increased and the speed-increased rotation of the planetary shaft 26 is transmitted to the rotor 14. On the other hand, in the case where the input shaft 36 rotates in the direction for which speed reduction should not be made, the clutch spring 34 of the one-way clutch mechanism 20 is separated from the inner peripheral surface of the planetary shaft 26 so as to release the connection between the input shaft 26 and planetary shaft 26, preventing the rotation of the input shaft 36 from being transmitted to the planetary shaft 26. As a result, the rotation is not transmitted to the rotor 14.

Figure 4:
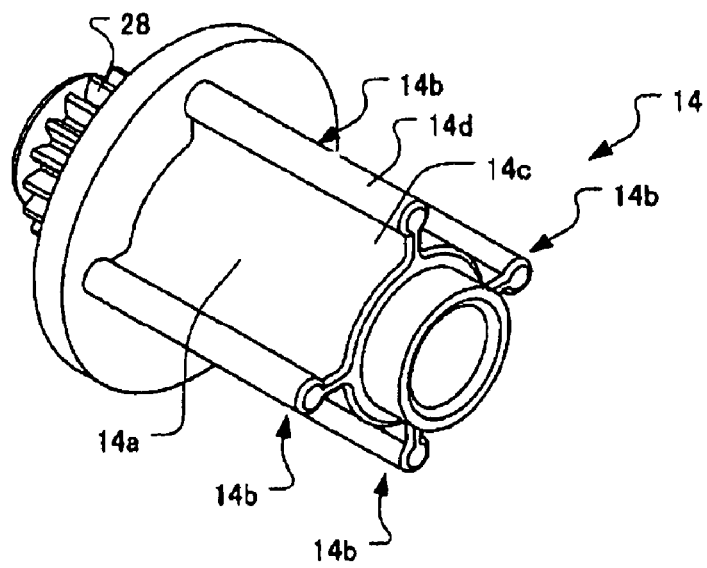
FIG. 4 is a perspective view of the rotor.

As shown in FIG. 4, the rotor 14 has a cylindrical shaft portion 14a, a plurality of (four, in this example) weight support portions 14b radially projecting from the peripheral surface of the shaft portion 14a at equal intervals in the circumferential direction of the cylindrical shaft. Each of the weight support portions 14b has a neck portion 14c radially extending from the cylindrical shaft and a head portion 14d formed at the distal end of the neck portion 14c. In the traverse cross-sectional view of FIG. 2, the neck portion 14c has a rectangular cross-section, the head portion 14d has a circular cross-section, and the diameter of the head portion 14d having the circular cross-section is larger than the thickness of the neck portion 14c having the rectangular cross-section.

Figure 5:
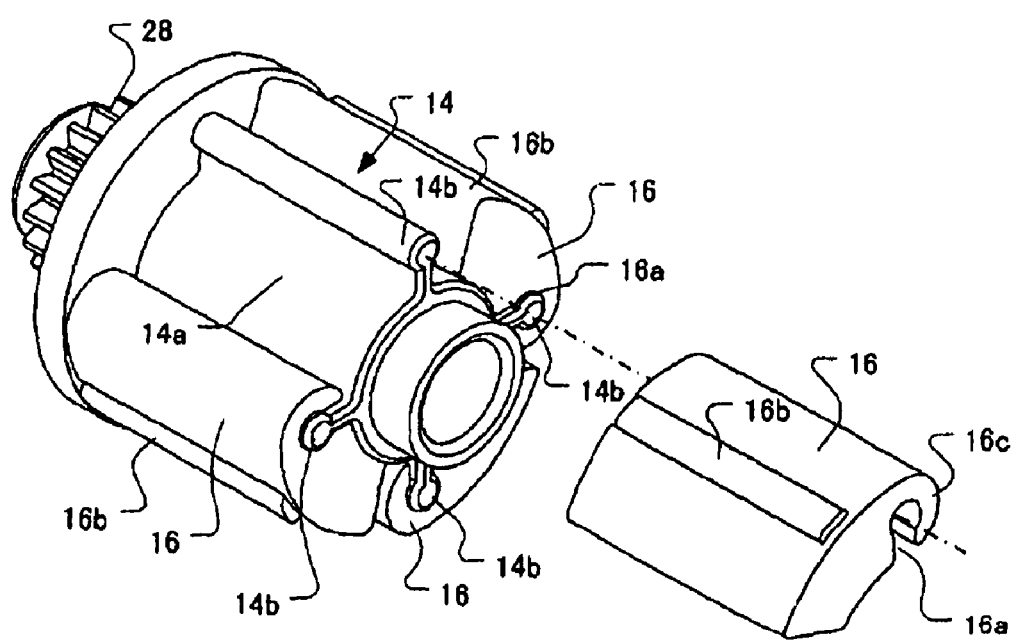
FIG. 5 is a partially exploded perspective view of the rotor and weights.

As shown in FIG. 5, each weight 16 whose one base end portion 16c is swingably supported by the weight support portion 14b has inside thereof a groove 16a having a shape corresponding to the shape of the neck portion 14c and head portion 14d of the weight support portion 14b. The neck portion 14c and head portion 14d are inserted into the groove 16a for assembly. However, a slight gap is formed between the neck portion 14c and the wall surface of the groove 16a as shown in FIG. 2. After assembly, even if the weight 16 is opened by the centrifugal force, the head portion 14d having the diameter larger than the thickness of the neck portion 14c prevents the weight 16 from dropping from the weight support portion 14b.

The length of the weight support portion 14b in the axial direction thereof is set equal to or more than the axial-direction entire length of the weight 16. That is, the weight support portion 14b extends over the axial-direction entire length of the weight 16.

Each weight 16 is provided on the outside portion thereof with a weight chip 16b that can slidably contact the inner peripheral surface of the casing 12. The casing 12 can be formed using a hard resin material. The weight chip 16 can be formed using an elastic material such as thermoplastic elastomer or synthetic rubber.

In the braking apparatus for blind having the configuration described above, when a rotation in the direction for which speed reduction should be made is transmitted to the input shaft 36 from the blind drive shaft 40, a speed-increased rotation is transmitted to the rotor 14 through the one-way clutch mechanism 20 and planetary gear mechanism 18. When the rotor 14 rotates, each weight 16 swings, by the centrifugal force, about a support point of the weight support portion 14b such that the free-end portion of the weight 16 moves outward. As a result, each weight chip 16b is in sliding contact with the inner peripheral surface of the casing 12, whereby braking effect is obtained.

More specifically, when the rotor 14 rotates so that the centrifugal force is applied, the base end portion 16c of each weight 16 pivots around the head portion 14d of the weight support portion 14b at the support point of the weight support portion 14b, thereby allowing the weight 16 to swing. Since the gap is formed between the grove 16a and neck portion 14c, the weight 16 can swing in a swingable range from a completely closed state where the inner surface of the weight 16 contacts the shaft portion 14a of the weight support portion 14b as shown in FIG. 2(a) to a completely opened state where the weight chip 16b provided on the outside of the weight 16 contacts the casing 12 as shown in FIG. 2(b) without being interrupted by the neck portion 14c.

According to the present embodiment, each weight support portion 14b projects in the radial direction, so that it is possible to increase the number of weight support portions 14b to be formed (the number of the weight support portions 14b is preferably three, and more preferably four or more) while keeping the diameter of the shaft portion 14a of the rotor 14 as small as possible. As a result, it is possible to increase the number of the weights 16 to be supported. The more the number of the weights 16 (preferably three, and more preferably four or more), the larger the contact area with the casing 12 can be ensured, so that high braking power can be obtained. Further, the braking force is uniformly distributed in the circumferential direction, so that stable and balanced braking power can be obtained.

Further, each weight support portion 14b is formed integrally with the shaft portion 14a of the rotor 14 so as to extend over the axial-direction entire length of the weight 16. In particular, the neck portion 14c of the weight support portion 14b is integrally connected to the shaft portion 14a, so that it is possible to keep the mechanical strength and rigidity of the weight support portion 14b, thereby preventing axial wobbling of the weight support portion 14b. As a result, stable braking power can be obtained.

The invention claimed is:

1. A braking apparatus for blind used to reduce the speed of a shielding member of the blind when it is lifted and lowered, comprising:

a casing; a rotor rotatably supported within the casing; and
a plurality of weights adapted to rotate together with the rotor in such a way so as to generate braking power, wherein
a cylindrical shaft portion and a plurality of weight support portions radially projecting from a peripheral surface of the shaft portion at equal intervals in a circumferential direction of the shaft portion and extending along an axial direction thereof are formed on the rotor, and
one end portion of each weight is swingably supported by the weight support portion extending over an entire length of each weight in the axial direction, each weight swinging between a position contacting an outer peripheral surface of the shaft portion and a position contacting an inner peripheral surface of the casing.

2. The braking apparatus for blind according to claim 1, wherein
three or more of the weight support portions are formed on the peripheral surface of the shaft portion.

3. The braking apparatus for blind according to claim 1 wherein
the weight support portion includes a neck portion radially extending from the shaft portion and having a rectangular traverse cross-section and a head portion formed at the distal end of the neck portion and having a circular traverse cross-section,
a thickness of the neck portion having the rectangular traverse cross-section is smaller than a diameter of the head portion having the circular traverse cross-section,
a groove into which the neck portion and the head portion are inserted is formed in each weight, and
a gap is formed between the neck portion and the groove.

* * * * *